United States Patent (10) Patent No.: US 6,568,515 B2
Harries (45) Date of Patent: May 27, 2003

(54) HYDRAULIC ACTUATION SYSTEMS

(75) Inventor: David Anthony Harries, Stratford upon Avon (GB)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/989,614

(22) Filed: Nov. 20, 2001

(65) Prior Publication Data

US 2002/0060113 A1 May 23, 2002

(30) Foreign Application Priority Data

Nov. 21, 2000 (GB) .............................................. 0028310

(51) Int. Cl.$^7$ ............................................. B60K 41/22
(52) U.S. Cl. ........................ 192/3.58; 192/3.63; 74/335
(58) Field of Search ............................... 192/3.58, 3.62, 192/3.63, 85 C, 91 R; 74/335, 336 R

(56) References Cited

U.S. PATENT DOCUMENTS

| 4,589,532 | A | * | 5/1986 | Ito et al. ................. 192/3.62 X |
| 5,105,922 | A | * | 4/1992 | Yant ........................... 192/3.58 |
| 5,240,093 | A | * | 8/1993 | Wagner et al. ............. 192/3.58 |
| 6,015,031 | A | * | 1/2000 | Dorfschmid et al. ....... 192/3.58 |
| 6,446,522 | B1 | * | 9/2002 | Warren et al. ................. 74/335 |
| 2002/0046913 | A1 | * | 4/2002 | Harries ...................... 192/3.58 |
| 2002/0112552 | A1 | * | 8/2002 | Harries ......................... 74/335 |
| 2002/0119864 | A1 | * | 8/2002 | Harries ..................... 74/336 R |

FOREIGN PATENT DOCUMENTS

| EP | 0043 660 | | 4/1986 |
| EP | 0038113 | | 7/1986 |
| EP | 0059035 | | 1/1987 |
| EP | 0101 220 | | 1/1987 |
| EP | 0702 760 | | 10/1999 |
| GB | 0026178.4 | | 10/2000 |
| GB | 2368376 | A * | 5/2002 |
| GB | 2373033 | A * | 9/2002 |
| WO | WO 92/13208 | | 8/1992 |
| WO | WO 97/05410 | | 2/1997 |
| WO | WO 97/40300 | | 10/1997 |

\* cited by examiner

Primary Examiner—Richard M. Lorence
(74) Attorney, Agent, or Firm—Darby & Darby

(57) ABSTRACT

A hydraulic actuation system for an automated transmission system including an active clutch includes, a hydraulic clutch actuator for controlling engagement of the active clutch, a gear engagement actuator for controlling engagement of a gear, a hydraulic accumulator, a hydraulic fluid reservoir, a main control valve for selectively connecting the hydraulic clutch actuator and the gear engagement actuator to the accumulator or to the reservoir and an isolation valve for isolating the gear engagement actuator from the main control valve, when the clutch actuator is connected to the accumulator, the clutch actuator causing the clutch to engage when connected to the accumulator and causing the clutch to disengage when connected to the reservoir. Two such hydraulic actuation systems may be connected in parallel to control the clutches of a twin clutch transmission system, allowing the twin clutch transmission system to be driven in a restricted emergency mode, using only one clutch.

13 Claims, 7 Drawing Sheets

HYDRAULIC ACTUATION SYSTEMS

This invention relates to hydraulic actuation systems and in particular hydraulic actuation systems for automated transmission systems.

In automated transmission systems of, for example, the type disclosed in WO97/05410 or WO97/40300, whose content is expressly incorporated in the disclosure content of the present application, fluid pressure actuators are used to control actuation of a clutch actuator mechanism and/or a gear engaging mechanism. In accordance with WO97/05410, separate control valves are used to control the clutch actuator mechanism and the gear engaging mechanism.

WO97/40300 discloses a hydraulic actuation system in which a main control valve controls both the clutch actuation mechanism and, together with secondary valves, shift and select actuators of a gear engaging mechanism. The use of a single main control valve in this manner reduces the number of components, providing savings in the overall size and cost of the system. The design of the master control valve is however significantly more complicated, which reduces the cost savings.

The use of a main control valve to control both the clutch and gear engagement actuator requires that the gear engagement actuator is connected to a source of hydraulic fluid under pressure when the clutch actuator is connected to the source of hydraulic fluid under pressure, the gear engagement actuator being isolated from the source of hydraulic fluid under pressure only when the clutch actuator is connected to a reservoir.

When the transmission system utilises a clutch which is maintained in engagement by mechanical spring means, the clutch being disengaged by the application of fluid pressure to a clutch actuator, this form of hydraulic actuation system permits the clutch actuator and the gear engagement actuator to be depressurised when the vehicle is in gear with the clutch engaged, thereby reducing the number of potential leakage points when the actuation system is not in use.

However if the transmission system utilises an active clutch, which is maintained in engagement by the application of fluid pressure to a clutch actuator, the clutch being disengaged by connection of the clutch actuator to a reservoir, the hydraulic actuation system of the type known will require the gear engagement actuator to be pressurised whenever to clutch is engaged, thereby increasing the number of potential leakage points.

According to one aspect of the present invention a hydraulic actuation system for an automated transmission system including an active clutch comprises:
  a hydraulic clutch actuator for controlling engagement of an active clutch;
  a gear engagement actuator for controlling engagement of a gear; a source of hydraulic fluid under pressure;
  a hydraulic fluid reservoir;
  a main control valve for selectively connecting the hydraulic clutch actuator and the gear engagement actuator to the source of hydraulic fluid under pressure or to the reservoir; and
  an isolation valve for isolating the gear engagement actuator from the main control valve, when the clutch actuator is connected to the source of hydraulic fluid under pressure;
  the clutch actuator causing the clutch to engage when connected to the source of hydraulic fluid under pressure and causing the clutch to disengage when connected to the reservoir.

With the hydraulic actuation system disclosed above, the isolation valve will disconnect the gear engagement actuator from the source of hydraulic fluid under pressure when the clutch actuator is pressurised and the clutch engaged. The number of potential leakage points is thereby reduced.

According to a further aspect of the present invention a hydraulic actuation system for an automated twin clutch transmission system having:
  a first active clutch for transmitting torque via a first set of gears;
  a second active clutch for transmitting torque via a second set of gears; said hydraulic actuation system comprising;
  a source of hydraulic fluid under pressure;
  a hydraulic fluid reservoir;
  a first hydraulic clutch actuator for controlling engagement of said first active clutch;
  a second hydraulic clutch actuator for controlling engagement of said second active clutch;
  a first gear engagement actuator for controlling engagement of one if said first set of gears;
  a second gear engagement actuator for controlling engagement of one of said second set of gears;
  a first main control valve for selectively connecting the first clutch actuator and the first gear engagement actuator to the source of hydraulic fluid under pressure or to the reservoir; and
  a first isolation valve for isolating the first gear engagement actuator from the first main control valve, when the first clutch actuator is connected to the source of hydraulic fluid under pressure;
  a second main control valve for selectively connecting the second clutch actuator and the second gear engagement actuator to the source of hydraulic fluid under pressure or to the reservoir; and
  a second isolation valve for isolating the second gear engagement actuator from the second main control valve, when the second clutch actuator is connected to the source of hydraulic fluid under pressure;
  the first and second main control valves being connected to the source of hydraulic fluid under pressure and to the reservoir in parallel. With the twin clutch transmission system disclosed above the hydraulic control system permits a gear associated with one clutch to be engaged while that clutch is disengaged and the other clutch is engaged. Said one clutch may then be engaged as said other clutch is disengaged, in order to engage a new gear. The engagement of one clutch and disengagement of the other clutch may be controlled so that the torque transmitted is maintained constant and a smooth change is achieved.

The use of parallel hydraulic actuation systems permits one clutch and the gears associated therewith to be used, even though the other clutch/actuation system may be inoperative, so that the vehicle may be driven, albeit in a restricted mode.

The invention is now described by way of example only, with reference to the accompanying drawings, in which.

Figure 1:
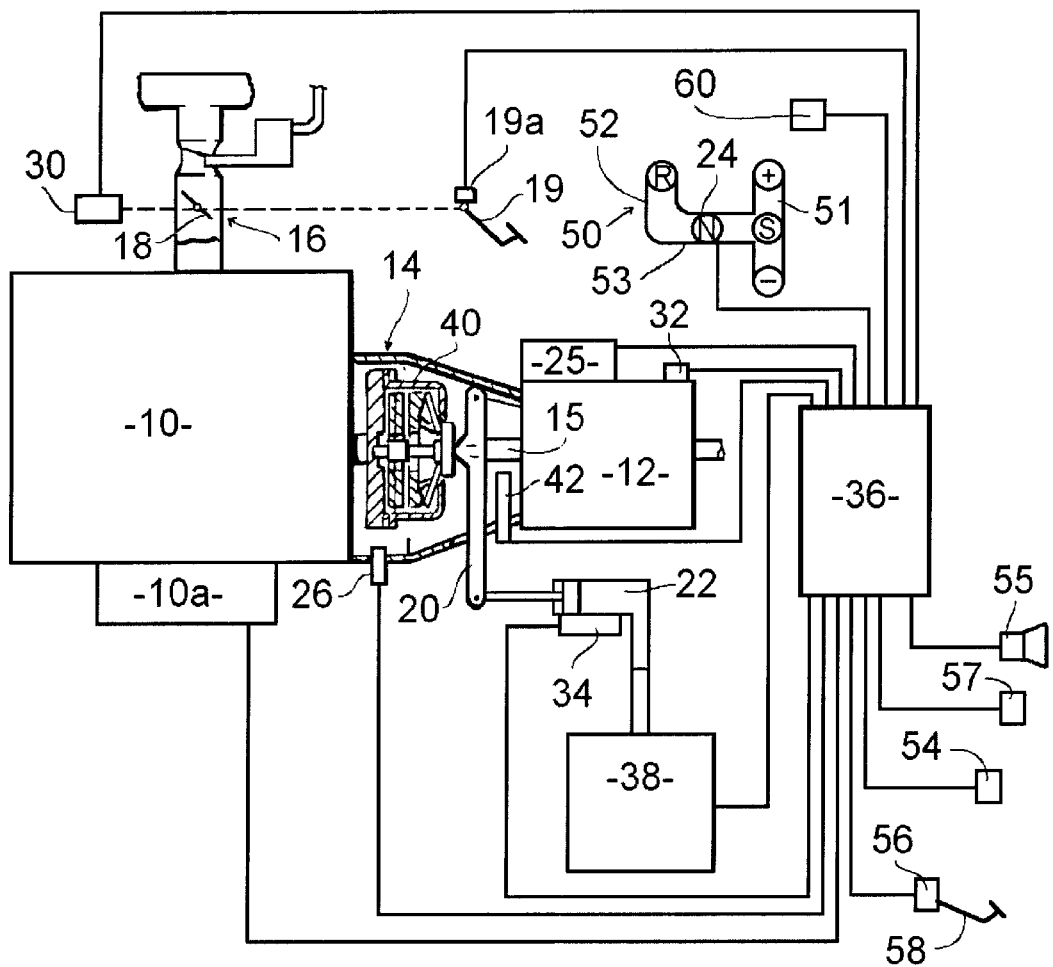
FIG. 1 shows diagrammatically a semi-automated transmission system utilising a hydraulic actuation system in accordance with the present invention.

FIG. 1 of the accompanying drawings shows an engine 10 with a starter and associated starter circuit 10a which is coupled through the main drive friction clutch 14 to a multi-speed synchromeshed lay shaft-type gearbox 12, via a gearbox input shaft 15. Fuel is supplied to the engine by a throttle 16 which includes a throttle valve 18, operated by accelerator pedal 19. The invention is equally applicable to electronic or mechanical fuel injection petrol or diesel engine.

The clutch 14 is actuated by a release fork 20 which is operated by a hydraulic slave cylinder 22, under the control of a clutch actuator control means 38. The clutch 14 is an active clutch, plates of the clutch 14 being urged apart by mechanical spring means, the load applied by the spring means being opposed by pressurisation of the clutch slave cylinder 22 to urge the plates into frictional engagement and engage the clutch 14 so that it will transmit torque.

A gear selector lever 24 operates in a gate 50 having two limbs 51 and 52 joined by a cross track 53 extending between the end of limb 52 and intermediate of the ends of limb 51. The gate 50 defines five positions; "R" at the end of limb 52; "N" intermediate of the ends of the cross track 53; "S" at the junction of limb 51 with the cross track 53; and "+" and "−" at the extremities of limb 51. In limb 51 the lever 24 is biased to the central "S" position. The "N" position of the selector lever 24 corresponds to neutral; "R" corresponds to selection of reverse gear; "S" corresponds to selection of a forward drive mode; momentary movement of the lever to the "+" position provides a command to cause the gearbox to shift up one gear ratio; and momentary movement of the gear lever 24 to the "−" position provides a command to cause the gearbox to shift down one gear ratio.

The positions of the lever 24 are sensed by a series of sensors, for example micro switches or optical sensors, positioned around the gate 50. Signals from the sensors are fed to an electronic control unit 36. An output from the control unit 36 controls a gear engaging mechanism 25, which engages the gear ratios of the gearbox 12, in accordance with movement of the selector lever 24 by the vehicle operator.

In addition to signals from the gear selector lever 24, the control unit 36 receives signals from:

sensor 19a indicative of the degree of depression of the accelerator pedal 19;

sensor 30 indicative of the degree of opening of the throttle control valve 18;

sensor 26 indicative of the engine speed;

sensor 42 indicative of the speed of the clutch driven plate; and sensor 34 indicative of the clutch slave cylinder position.

The control unit 36 utilises the signals from these sensors to control actuation of the clutch 14 during take-up from rest and gear changes, for example as described in patent specifications EP0038113, EP0043660, EP0059035, EP0101220 and WO92/13208 whose content is expressly incorporated in the disclosure content of the present application.

In addition to the above mentioned sensors, control unit 36 also receives signals from a vehicle speed sensor 57, ignition switch 54 and brake switch 56 associated with the main braking system, for example the footbrake 58 of the vehicle.

A buzzer 55 is connected to the control unit 36 to warn/indicate to the vehicle operator as certain operating conditions occur. In addition or in place of the buzzer 55 a flashing warning light or other indicating means may be used. A gear indicator 60 is also provided to indicate the gear ratio selected.

Figure 2:
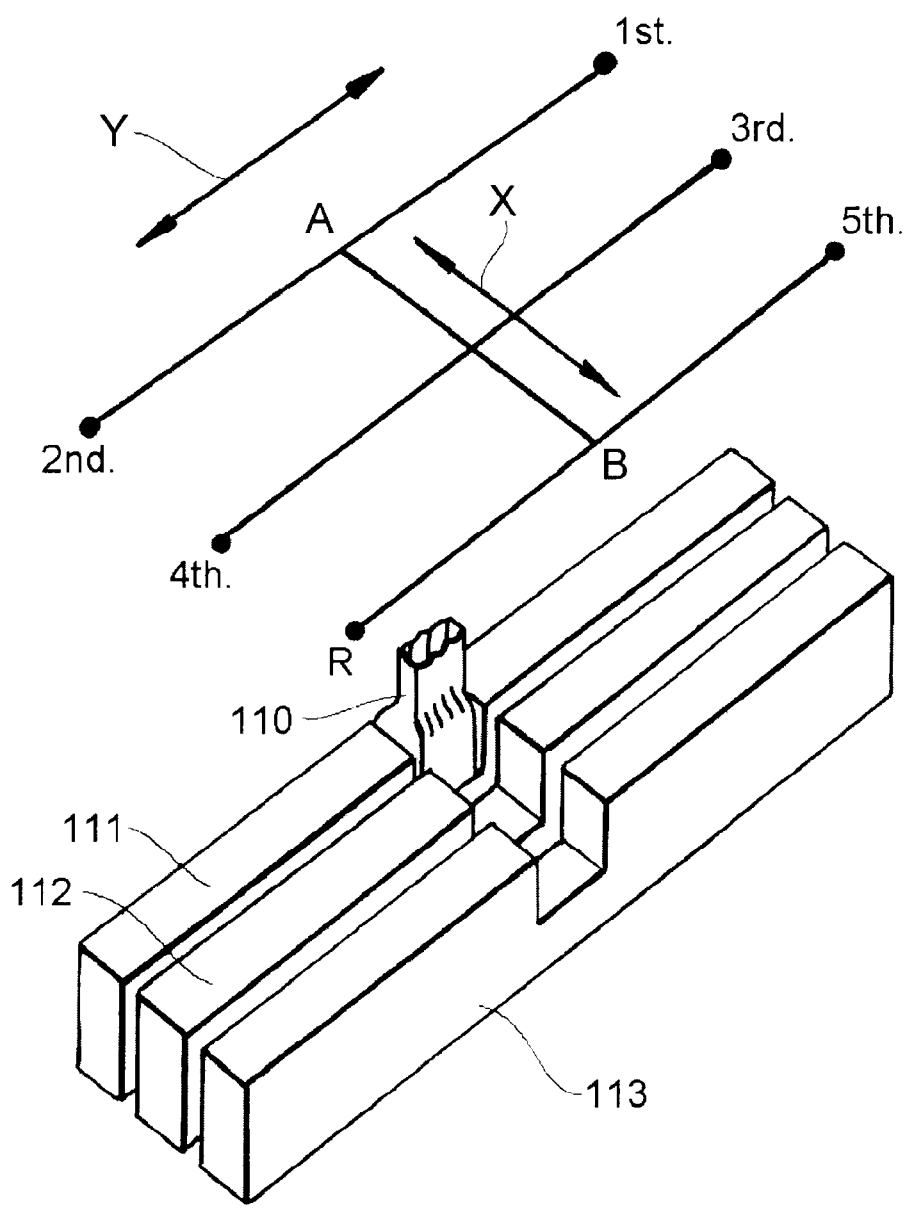
FIG. 2 shows a gear selector mechanism and associated selector gate of the transmission system illustrated in FIG. 1.

As illustrated in FIG. 2, the gear engagement mechanism 25 comprises three shift rails 111, 112, 113 mounted parallel to one another for movement in an axial direction. Each shift rail 111, 112, 113 is associated with two of the gear ratios of the gearbox 12, via a selector fork and synchromesh unit in conventional manner, so that movement of the shift rails 111, 112, 113 in one axial direction will cause engagement of one of the associated gear ratios and axial movement of the shift rail 111, 112, 113 in the opposite axial direction will cause engagement of the other associated gear ratio.

Typically; first and second gear ratios are associated with shift rail 111, so that axial movement of the shift rail 111 in a first direction will engage first gear or axial movement of shift rail 111 in a second direction will engage second gear; third and fourth gear ratios are associated with shift rail 112, so that axial movement of shift rail 112 in the first direction will engage third gear or axial movement of shift 112 in a second direction will engage fourth gear; and fifth and reverse gear ratios are associated with shift rail 113, so that axial movement of shift rail 113 in the first direction will engage fifth gear while axial movement of shift rail 113 in the second direction will engage reverse gear.

A selector member 110 is mounted for movement in a select direction X transverse to the axes of the shift rails 111, 112, 113 and in a shift direction Y, for movement axially of the shift rails 111, 112 and 113. The selector member 110 may thus be moved in direction X along a neutral plane A-B, so that it may be indexed with and engaged a selected one of the shift rails 111, 112 and 113. The selector member 110 may then be moved in direction Y to move the engaged shift rail 111, 112, 113 axially in either direction to engage one of the gear ratios associated therewith.

Figure 3:
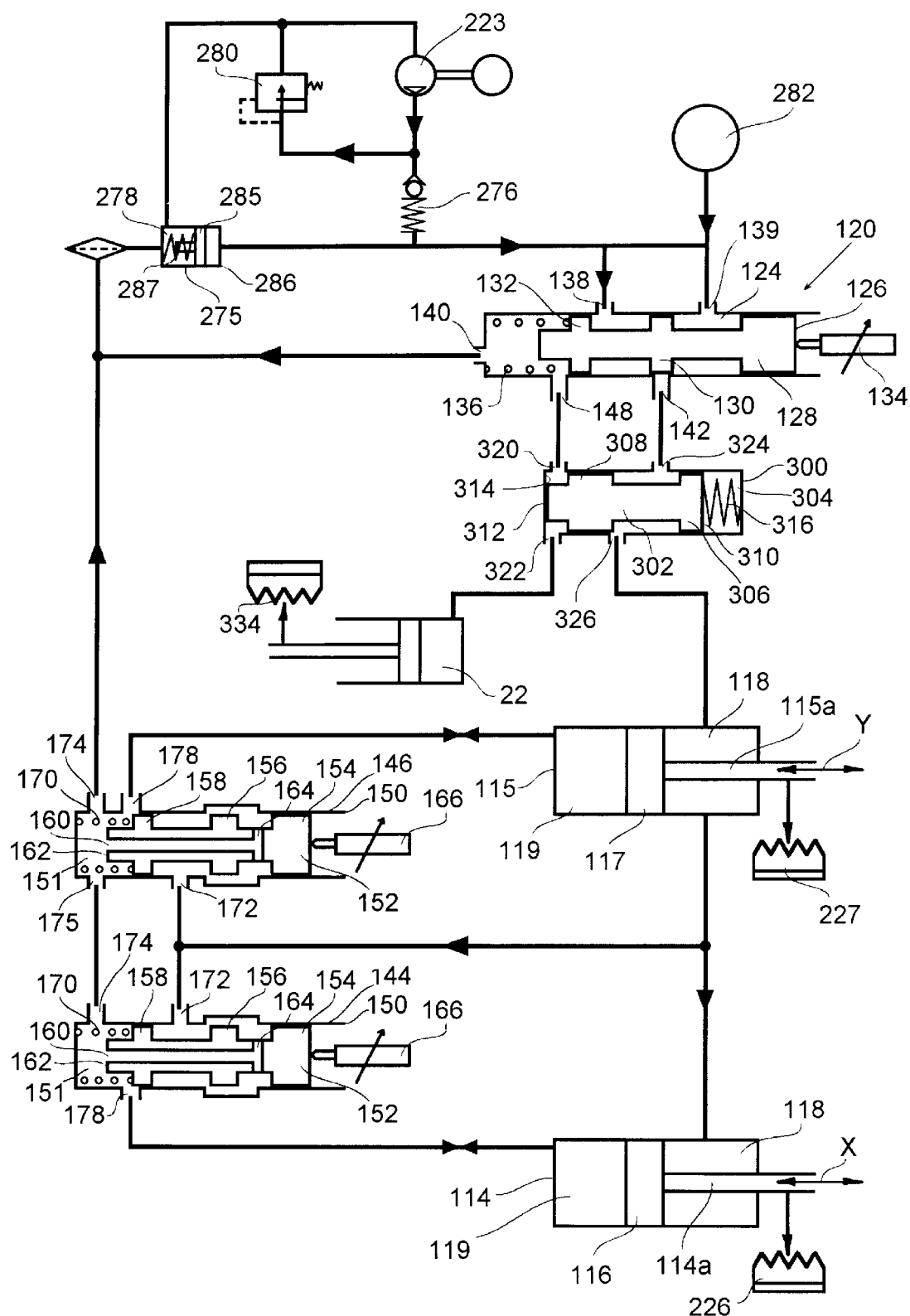
FIG. 3 illustrates diagrammatically the hydraulic actuation system of the transmission system illustrated in FIG. 1.

As illustrated in FIG. 3, selector member 110 is movable in the select direction X by means of a fluid pressure operated select actuator 114, along the neutral plane A-B of the gate illustrated in FIG. 2, to align the select member 110 with one of the shift rails 111, 112, 113, and thereby select a pair of gears associated with that shift rail. The selector member 110 may then be moved in the shift direction Y by means of a fluid pressure operated shift actuator 115, to move the shift rail 111, 112, 113 axially in either direction to engage one of the gear ratios associated therewith.

The actuators 114 and 115 each comprise a double-acting ram having pistons 116, 117 respectively, which divide the actuators 114, 115 into two working chambers 118, 119, the working chambers 118, 119 being disposed on opposite sides of each of the pistons 116, 117. Operating rods 114a, 115a extend from one side of the pistons 116, 117 respectively and are operatively connected with the selector member 110 for movement thereof in the select and shift directions X and Y respectively. As a consequence of the connection of operating rods 114a, 115a to the pistons 116, 117, the working area of pistons 116, 117 exposed to working chamber 118 is smaller than the working area of pistons 116, 117 exposed to working chamber 119.

A solenoid operated main control valve 120 comprises a housing 122, defining a bore 124. A spool 126 is slideably located in the bore 124, the spool 126 having three axially spaced circumferential lands 128, 130, 132 which sealingly engage the bore 124. A solenoid 134 acts on one end of the spool 126, so that upon energisation of the solenoid 134, the spool 126 is moved axially of the bore 124 against a load applied by a compression spring 136, acting on the opposite end of the spool 126.

Inlets 138 and 139 to the bore 124 of valve 120 are connected to a spring accumulator 275. The spring accumulator 275 comprises a piston 285 which is slidably sealed in a cylinder 286. A spring 287 acts on one side of the piston 285 biasing it to one end of the cylinder 286. An electrically-driven pump 223 is provided to charge the accumulator 275 via a non-return valve 276, delivering fluid to the side of the piston 285 remote from the spring 287, thereby compressing the spring 287 and pressurising the fluid. The side of the piston 285 from which the spring 287 acts, is vented and serves as a fluid reservoir 278 for the system. A pressure transducer 282 is provided between the spring accumulator 275 and inlets 138, 139 of the main control valve 120 to measure the accumulator pressure and send signals corresponding thereto to the control unit 36.

An outlet 140 from the bore 124 of main control valve 120 is connected to the reservoir 278. A first port 142 from bore 124 is connected to working chambers 118 of the select and shift actuators 114, 115 and selectively to working chambers 119 via select and shift valves 144, 146 and a second port 148 is connected to the clutch slave cylinder 22. A pressure relief valve 280 is provided between the outlet of the pump 223 and the reservoir 278, to ensure that the pressure supplied by the pump 223 does not exceed a maximum predetermined value.

The shift and select valves 144, 146 are both solenoid operated valves having a housing 150 defining a bore 151 with a spool 152 slideably mounted in the bore 151. The spool 152 has three axially spaced circumferential lands 154, 156, 158, the lands sealingly engaging the bore 151. An axial bore 160 opens to end 162 of the spool 152 and connects to a cross-bore 164, the cross-bore 164 opening between lands 154 and 156 of the spool 152. A solenoid 166 acts on end 168 of spool 152 remote from the end 162, so that upon energisation of the solenoid 166, the spool 152 will move axially of the bore 151 against a load applied by a compression spring 170 acting on end 162 of the spool 152.

An inlet 172 to the bore 151 is connected to port 142 of the main control valve 120. An outlet 174 from the bore 151 is connected to the reservoir 278. Port 178 of the select valve 144 is connected to the second working chamber 119 of the select actuator 114 and port 178 of shift valve 146 is connected to the second working chamber 119 of shift actuator 115.

Figure 9:
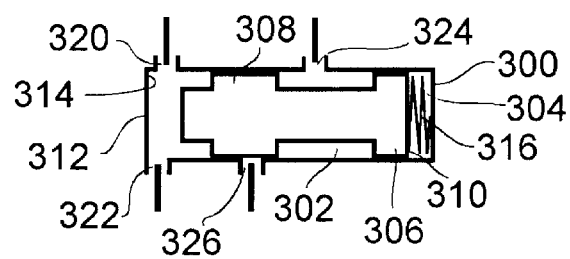
FIG. 9 shows a sectional diagrammatic illustration of the isolation valve of the hydraulic actuation system illustrated in FIG. 3, showing the position of the isolation valve when the clutch actuator is pressurised.
Figure 7:
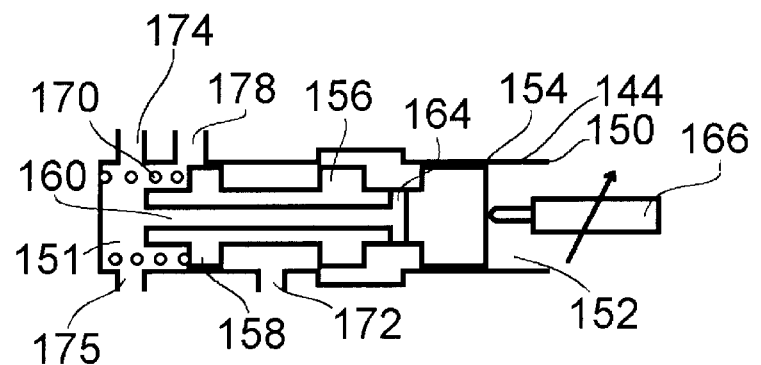
FIG. 7 shows a view similar to FIG. 6 with the gear shift control valve in an energised third position.
Figure 8:
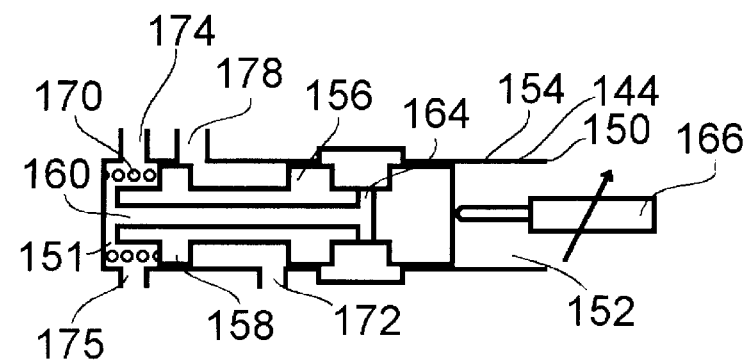
FIG. 8 shows a view similar to FIG. 6 of the gear shift control valve in an energised fourth position.

The construction and operation of the valves 144 and 146 and actuators 114 and 115 are identical as illustrated in FIGS. 7 to 9.

Port 148 of the main control valve 120 is connected to the clutch slave cylinder 22 and port 142 of the main control valve 120 is connected to the select and shift actuators 114, 115 and select and shift valves 144, 146, via an isolation valve 300. The isolation valve 300 comprises a spool 302 which is slidably mounted in a closed bore 304. The spool 302 has a pair of axially separated land formations 306, 308 of increased diameter, the land formations 306, 308 sealingly engaging the wall of the bore 304. Land formation 306 is located at one end 310 of the spool 302, the other land formation 308 being spaced from the other end 312 of spool 302. A helical compression spring 316 acts on end 310 of spool 302 urging the other end 312 thereof into abutment with the opposite end 314 of bore 304.

Port 148 of the main control valve 120 is connected to the bore 304 of isolation valve 300 by means of port 320 which opens to the bore 304 between the end 314 thereof and the land formation 308 of the spool 302, when the spool abuts the end 314 of bore 304;

the clutch slave cylinder 22 is connected to the bore 304 of isolation valve 300 by means of port 322 which opens to the bore 304 between the end 314 thereof and the land formation 308 of the spool 302, when the spool abuts the end 314 of bore 304;

port 142 of the main control valve 120 is connected to the bore 304 of isolation valve 300 by means of port 324 which opens to the bore 304 at a position intermediate of the land formations 306 and 308 of the spool 302; and the select and shift actuators 114, 115 and select and shift valves 144, 146 are connected to the bore 304 of isolation valve 300 by means of port 326 which opens to the bore 304 at a position intermediate of the land formations 306 and 308 of the spool 302, the port 326 being disposed axially closer to land 308 that port 324.

When the clutch slave cylinder 22 is connected to the accumulator 275 by the main control valve 120, the pressure acting on the end of spool 302 of isolation valve 300, will oppose the load applied thereto by spring 316, causing the spool 302 to move away from the end 314 of bore 304, until the land formation 308 closes port 326 and isolates the select and shift actuators 114, 115 and select and shift valves 144, 146 from the accumulator 275 as illustrated in FIG. 9. The spring 316 is rated such that the isolation valve 300 will isolate the select and shift actuators 114, 115 and select and shift valves 144, 146 from the accumulator 275 when pressure in the clutch slave cylinder rises above a predetermined valve, typically of the order of 3 bar.

When the hydraulic system is switched off, the solenoids 134 and 166 will be de-energised and valves 120, 144 and 146 will be in the rest positions illustrated in FIG. 3. In this position, the clutch slave cylinder 22 is connected via port 148 and outlet 140 of the main control valve 120 to the reservoir 278 and the clutch 14 is disengaged. The select and shift actuators 114, 115 and select and shift valves 144, 146 are isolated from the accumulator 275 by land 130 of the main control valve 120. The working chambers 118 of the select and shift actuators 114, 115 are connected to the reservoir 278 via inlet 172, passageways 164, 160 and outlet 174 of the select and shift valves 144, 146 and working chambers 119 of the select and shift actuators 114, 115 are connected to the reservoir 278 via port 178 and outlet 174 of the select and shift valves 144, 146. There will consequently be no movement of the clutch slave cylinder 22 or the select and shift actuators 114, 115.

Figure 6:
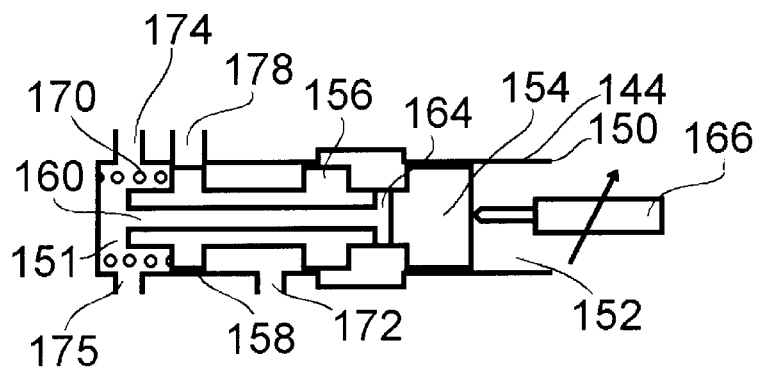
FIG. 6 shows a sectional diagrammatic illustration of the gear shift control valve of the hydraulic actuation system illustrated in FIG. 3, in an energised null position.

When a gear change is initiated by, for example, the driver of the vehicle moving the gear selector lever 24 momentarily to the '+' position, or by automatic initiation, solenoids 166 of the select and shift control valves 144, 146 are energised to move the spool 152 to a null position as illustrated in FIG. 6. In this position, the land 158 of spool 152 closes port 178 thereby closing working chamber 119 and creating a hydraulic lock preventing movement of the select and shift actuators 114 and 115, even though working chambers 118 thereof are connected to the spring accumulator 275 by the main control valve 120. The connection of port 172 to the outlet 174 via bores 160 and 164 is also closed.

Figure 4:
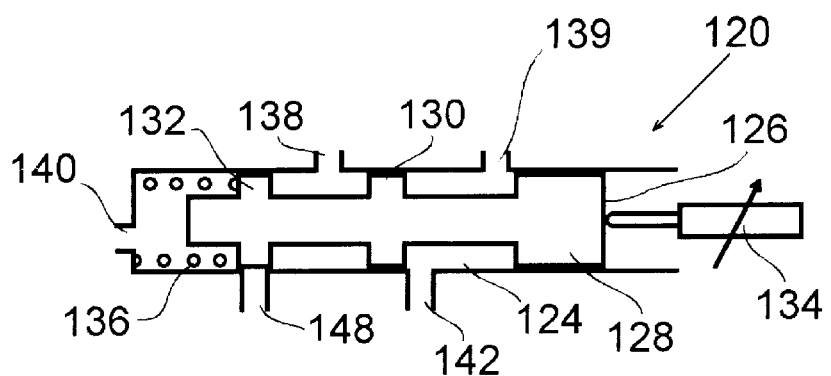
FIG. 4 shows a sectional diagrammatic illustration of the main control valve of the hydraulic actuation system illustrated in FIG. 3, in an energised second position.

Solenoid 134 is then energised to move the spool 126 of main control valve 120 to a second position, as illustrated in FIG. 4. In this second position port 148 of the main control valve is closed by land 132, isolating the clutch slave cylinder 22 from the accumulator and the reservoir, while the working chambers 118 of both the select and shift actuators 114, 115, and inlets 172 of the select and shift valves 144, 146 are connected to the spring accumulator 275, via port 142 and inlet 138. In this second position as no pressure is applied to the clutch slave cylinder 22, the clutch 14 will remain disengaged and the isolation valve 300 will remain in the position illustrated in FIG. 3.

The solenoids 166 of the select and shift valves 144, 146 may then be selectively energised, moving the select and shift valves 144, 146 between third and fourth positions illustrated in FIGS. 7 and 8, in order to disengage the currently selected gear and engage a new gear.

Energisation of solenoid 166 to move the select or shift valve 144, 146 to the third position illustrated in FIG. 7, in which working chamber 119 is connected to reservoir 278, while working chamber 118 is connected to the accumulator 275, will create a pressure differential across the pistons 116 and 117, causing the operating rod 114a, 115a to extend. Energisation of solenoid 166 to move the select or shift valve 144, 146 to the fourth position illustrated in FIG. 8, in which both working chambers 118 and 119 are connected to the accumulator 275, will cause the operating rods 114a, 115a to retract, due to the differential working areas of the pistons 116 and 117. Consequently, by appropriate control solenoids 166 of the select and shift valves 144, 146, the selector member 110 may be moved to engage the desired gear.

Potentiometers 226 and 227 are connected to the operating rods 114a, 115a respectively, to provide signals indicative of the position of the associated operating rods. Signals from the potentiometers 226, 227 are fed to the control unit 36 to provide an indication of the position of the operating rods is 114a, 115a, for each of the gear ratios of the gear box 12 and also to indicate the position of the operating rod 115a, when the select member 110 is in the neutral plane A-B of FIG. 2. The transmission system may thus be calibrated, so that predetermined position signals from the potentiometers 226 and 227 correspond to engagement of each of the gear ratios of the gear box 12.

Measurements from the potentiometers 226 and 227 may thus be used by a closed loop control system to control valves 144 and 146, to move the operating rods 114a and 115a, to the predetermined positions to engage the desired gear ratio.

When the desired gear ratio has been engaged, the solenoids 166 of the select and shift valves 144, 146 are energised to move the valves 144, 146 back to their null positions as illustrated in FIG. 6, closing the ports 178 and creating a hydraulic lock preventing movement of the actuators 114, 115.

Figure 5:
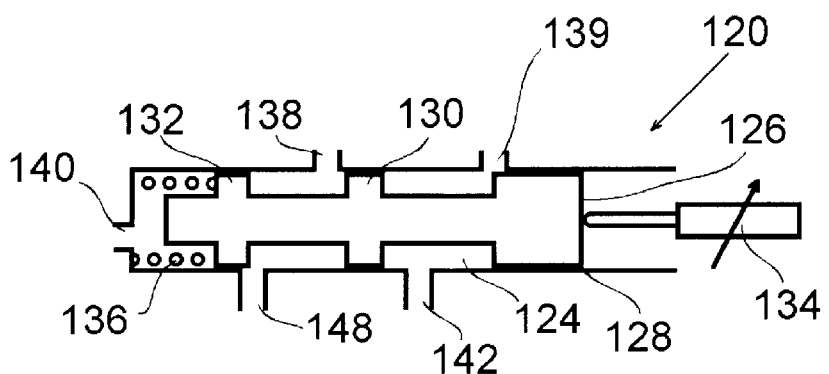
FIG. 5 shows a view similar to FIG. 4 of the main control valve in an energised third position.

Solenoid 134 of the main control valve 120 may then be energised to move the main control valve 120 from its second position to its third position as illustrated in FIG. 5, thereby connecting the clutch slave cylinder 22 to the accumulator 275 and moving the plates of the clutch 14 into frictional engagement to engage the clutch 14. The main control valve 120 may be switched between the first position illustrated in FIG. 3 and third position illustrated in FIG. 5, so that the clutch 14 is re-engaged in controlled manner, for example as disclosed in EP0038113; EP0043660; EP0059035; EP0101220 or WO92/13208.

As soon as pressure in the clutch slave cylinder 22 rises above the predetermined value, the spool 302 of isolation valve 300 closes the connection between the select and shift actuators 114, 115 and select and shift valves 144, 146 and the accumulator 275. The number of potential leakage points is thereby reduced. Furthermore the isolation valve 300 prevents movement of the select and shift actuators, while the clutch 14 is engaged.

As soon as the clutch 14 is engaged, the select and shift actuators 114, 115 and select and shift valves 144, 146 may be depressurised by de-energising solenoids 166 and returning the select and shift valves 144, 146 to there rest positions, as illustrated in FIG. 3.

The main control valve 120 remains energised in its third position until a gear change is required or it is required to move to neutral. Solenoids 166 would then be energised to move the select and shift valves to the null position illustrated in FIG. 6 followed by de-energisation of the main control valve 120, to the position illustrated in FIG. 3, so that the clutch slave cylinder 22 is connected to the reservoir 278 and the clutch 14 will disengage ready for the change of gear.

According to a preferred embodiment of the invention, the cylinder 286 of the accumulator, the bore 124 of the main control valve 120, the bores 151 of the select and shift valves 144, 146, the cylinders of the select and shift actuators 114, 115, and/or the bore 304 of the isolation valve, may be defined by a common housing, the bores/cylinders of the various components being appropriately inter-connected by passages through the common housing. The valve/actuator pack so formed would be mounted on or adjacent the gearbox 12.

The electrically driven pump 223, and control unit 36 may also be mounted with the valve/actuator pack or may be mounted remotely thereof and interconnected thereto by, for example, elastomeric pressure hoses.

Figure 10:
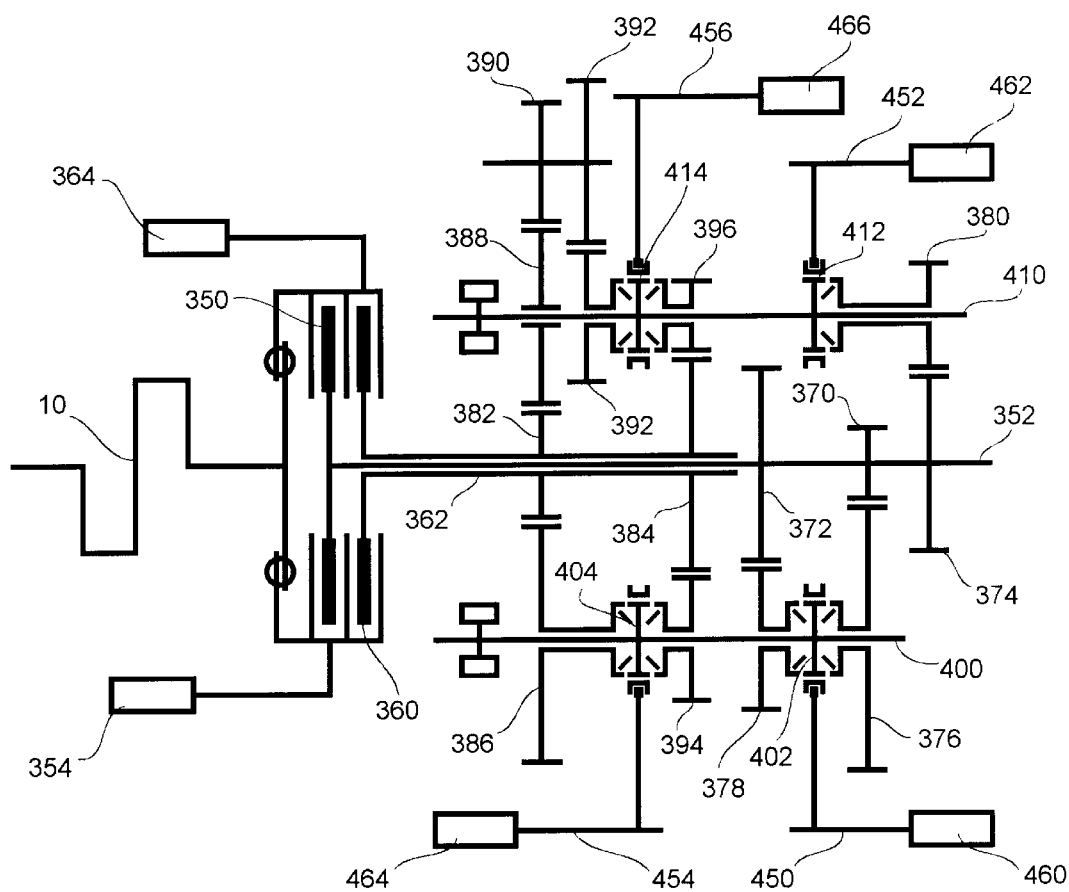
FIG. 10 shows a diagrammatic illustration of a twin clutch transmission system.

In the transmission system illustrated in FIG. 10 a first active clutch 350, when engaged, transmits torque between the output shaft of engine 10 and a first input shaft 352 of the gearbox and a second active clutch 360, when engaged, transmits torque between the output shaft of engine 10 and a second input shaft 362 of the gearbox.

Engagement of clutches 350 and 360 is controlled independently by clutch slave cylinders 354 and 364 respectively, hydraulic pressure being applied to the slave cylinders 354, 364 to engage the clutches.

Input shaft 352 has three gears 370, 372, 374 mounted thereon for rotation therewith. Gear 370 meshes with a gear 376 to provide a first gear ratio; Gear 372 meshes with a gear 378 to provide a third gear ratio; and gear 374 meshes with a gear 380 the provide a fifth gear ratio. Input shaft 362 has two gears 382, 384 mounted thereon for rotation therewith. Gear 382 meshes with a gear 386 to provide a second gear ratio; and with gear 388, which in turn meshes with gears 390 and 392 to provide a reverse gear ratio. Gear 384 meshes with a gear 394 to provide a fourth gear ratio; and with a gear 396 to provide a sixth gear ratio.

The gears 376, 378, 386 and 394 are mounted on a lay shaft 400 for rotation relative thereto, gears 376 and 378, and gears 386 and 394 being selectively engaged with the lay shaft 400, by means of synchromesh units 402 and 404 respectively, in conventional manner. Gears 380, 392, 388 and 396 are mounted on a lay shaft 410 for rotation relative thereto, gear 380 and gears 392 and 396 being selectively engaged with to lay shaft 410 by means of synchromesh units 412 and 414 respectively.

The synchromesh units 402, 404, 412, 414 are controlled independently by shift rails 450, 452, 454, 456 respectively, the shift rails 450, 452, 454, 456 being moveable axially from a central neutral position, to either side in order to engage one of the gears associated with the synchromesh unit.

Clutch 350 may consequently be used to engage the first, third or fifth gear ratio, and clutch 360 may be used to engage the second, fourth, sixth or reverse ratio, by suitable manipulation of the shift actuators 460 and 462; and 464 and 466 respectively. When the transmission is in gear with one of the clutches 450, 460 engaged, a gear associated with the disengaged clutch 460, 450 may be selected. In order to change gear, the engaged clutch 450, 460 is disengaged, the other clutch 460, 450 at the same time being engaged, the torque transmitted by the two clutches being balanced to provide a smooth gear change.

The hydraulic actuation system for controlling the twin clutch transmission system disclosed above, as shown in FIG. 10, comprises two circuits substantially as described with reference to FIG. 3, the two circuits being connected in parallel. The same reference numerals are used for common components and the two circuits operate in the same manner as the circuit described with reference to FIG. 3.

In the first circuit, the main control valve 420 controls actuation of the first clutch 350 via clutch slave cylinder 354 and engagement of the first, third and fifth gears via shift actuators 460 and 462. In the second circuit the main control valve 422 controls actuation of the second clutch 360 via clutch slave cylinder 364 and engagement of the second, fourth, sixth and reverse gears via shift actuators 464 and 466.

Figure 11:
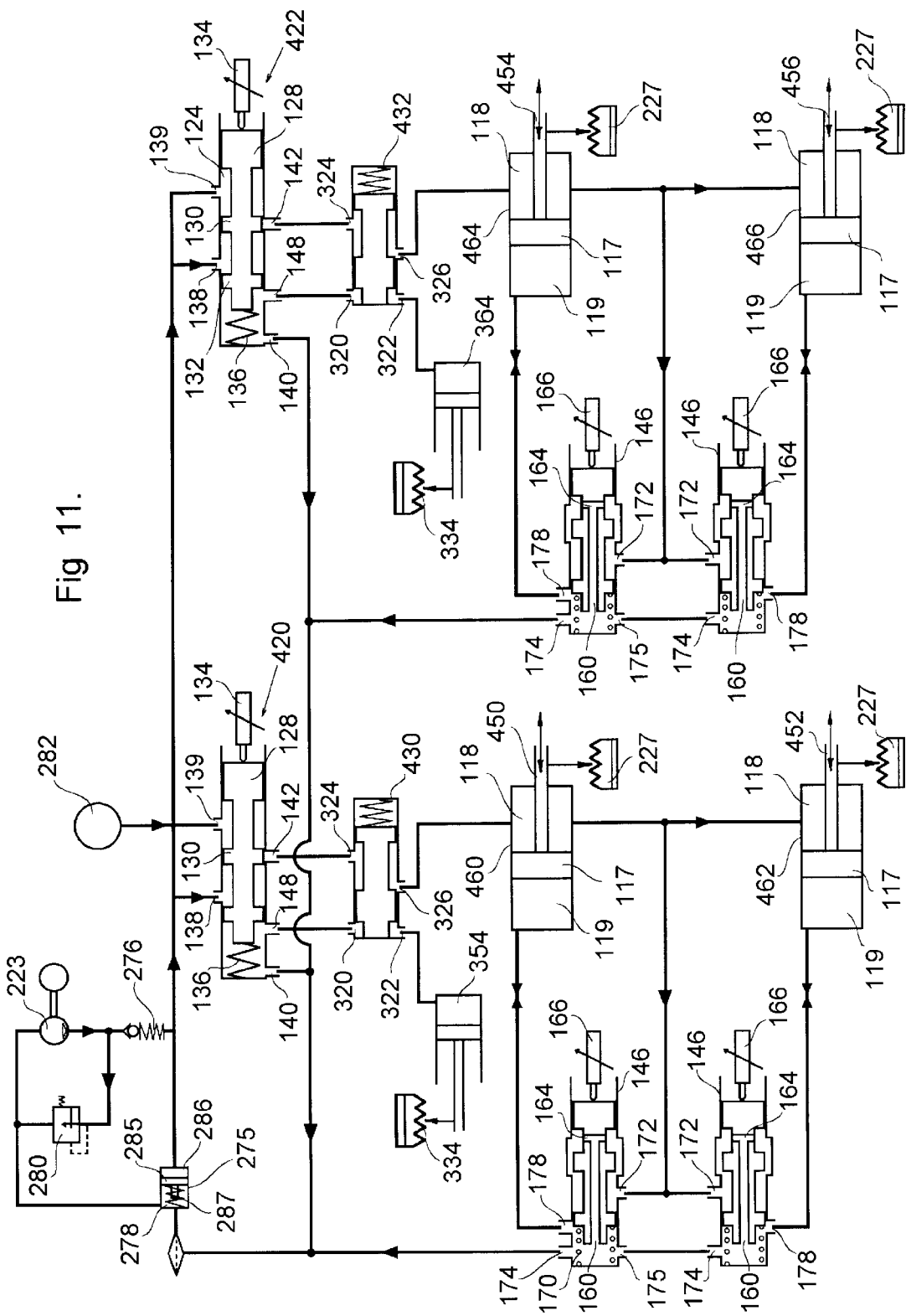
FIG. 11 illustrates diagrammatically the hydraulic actuation system of the transmission system illustrated in FIG. 10.

With the above transmission when first gear is engaged, the main control valve 420 will be in the position illustrated in FIG. 5 so that slave cylinder 354 is pressurised and clutch 350 engaged. Main control valve 422 will be in its rest position, as illustrated in FIG. 11, so that slave cylinder 364 is connected to reservoir 278 and clutch 360 disengaged. The shift valves 146 of shift actuators 464 and 466 are then moved to their null position as illustrated in FIG. 6. The main control valve 422 may now be energised to move it to the null position illustrated in FIG. 4, thereby energising the shift actuators 464 and 466 and shift valves 146 associated therewith. By manipulating the shift valve 146 associated with shift actuator 464, as described with reference to FIG. 3, the second gear may be engaged. The main control valve 420 may now be moved to its rest position illustrated in FIG. 11 and the main control valve 422 moved to its third position illustrated in FIG. 5, so that clutch 350 will disengage and clutch 460 will engage, in order to change from first gear to second gear.

With the transmission system described with reference to FIGS. 10 and 11, if one of the clutches fails, or the hydraulic circuit controlling one of the clutch fails, then the vehicle may still be driven on the other clutch. For example if clutch 460 were to fail, the vehicle could still be driven using clutch 450 only, drive being limited to first, third and fifth gears.

Various modifications may be made without departing from the invention. For example, while in the above embodiment the hydraulic circuit has been described with reference to a semi-automated transmission system, the invention is equally applicable to fully-automated transmission systems or to automated manual transmission systems.

Moreover while in the embodiment described above the clutch slave cylinder 22 is connected directly to the main control valve 120, a remote displacement valve with position sensing means of the type disclosed in EP 0702760 and GB 0026178.4 whose content is expressly incorporated in the disclosure content of the present application, may be interposed between the main control valve 120 and clutch slave cylinder 22.

With a twin clutch transmission, the gears associated with each clutch may be varied, as desired.

The patent claims submitted with the application are proposed formulations without prejudice to the achievement of further patent protection. The applicant reserves the right to submit claims for further combinations of characteristics, previously only disclosed in the description and/or drawings.

References back used in sub-claims refer to the further development of the subject of the main claim by the characteristics of the respective sub-claim; they are not to be understood as a waiver with regard to achieving independent item protection for the combination of characteristics in the related sub-claims.

Since the subject of the sub-claims can form separate and independent inventions with reference to the prior art on the priority date, the applicant reserves the right to make them the subject of independent claims or of division declarations. Furthermore, they may also contain independent inventions which demonstrate a design which is independent of one of the objects of the preceding sub-claims.

The embodiments are not to be considered a restriction of the invention. Rather, a wide range of amendments and modifications is possible within the scope of the current disclosure, especially those variations, elements and combinations and/or materials which, for example, the expert can learn by combining individual ones together with those in the general description and embodiments in addition to characteristics and/or elements or process stages described in the claims and contained in the drawings with the aim of solving a task thus leading to a new object or new process stages or sequences of process stages via combinable characteristics, even where they concern manufacturing, testing and work processes.

What is claimed is:

1. A hydraulic actuation system for an automated transmission system including an active clutch comprises:

a hydraulic clutch actuator for controlling engagement of an active clutch;

a gear engagement actuator for controlling engagement of a gear; a source of hydraulic fluid under pressure;

a hydraulic fluid reservoir;

a main control valve for selectively connecting the hydraulic clutch actuator and the gear engagement actuator to the source of hydraulic fluid under pressure or to the reservoir; and an isolation valve for isolating the gear engagement actuator from the main control valve, when the clutch actuator is connected to the source of hydraulic fluid under pressure;

the clutch actuator causing the clutch to engage when connected to the source of hydraulic fluid under pressure and causing the clutch to disengage when connected to the reservoir.

2. A hydraulic actuation system for an automated twin clutch transmission system having:

a first active clutch for transmitting torque via a first set of gears;

a second active clutch for transmitting torque via a second set of gears;

said hydraulic actuation system comprising;
- a source of hydraulic fluid under pressure;
- a hydraulic fluid reservoir;
- a first hydraulic clutch actuator for controlling engagement of said first active clutch;
- a second hydraulic clutch actuator for controlling engagement of said second active clutch;
- a first gear engagement actuator for controlling engagement of one of said first set of gears;
- a second gear engagement actuator for controlling engagement of one of said second set of gears;
- a first main control valve for selectively connecting the first clutch actuator and the first gear engagement actuator to the source of hydraulic fluid under pressure or to the reservoir; and
- a first isolation valve for isolating the first gear engagement actuator from the first main control valve, when the first clutch actuator is connected to the source of hydraulic fluid under pressure;
- a second main control valve for selectively connecting the second clutch actuator and the second gear engagement actuator to the source of hydraulic fluid under pressure or to the reservoir; and
- a second isolation valve for isolating the second gear engagement actuator from the second main control valve, when the second clutch actuator is connected to the source of hydraulic fluid under pressure;
- the first and second main control valves being connected to the source of hydraulic fluid under pressure and to the reservoir in parallel.

3. A hydraulic actuation system according to claim 1 in which the main control valve is moveable between;
- in a first position in which the clutch actuator is connected to the reservoir and the clutch actuator and gear engagement actuator are isolated from the source of fluid under pressure;
- in a second position in which the clutch actuator is isolated from the source of fluid under pressure and the reservoir and the gear engagement actuator is connected to the source of fluid under pressure; and
- in a third position in which the clutch actuator and the gear engagement actuator are connected to the source of fluid under pressure.

4. A hydraulic actuation system according to claim 1 in which the gear engagement actuator is selectively connected to the main control valve or to the reservoir by means of a gear engagement control valve.

5. A hydraulic actuation system according to claim 4 in which the gear engagement control valve is moveable between:
a) a rest position in which a first and a second working chamber of the gear engagement actuator and the connection to the main control valve are all connected to the reservoir;
b) a null position in which the first working chamber of the gear engagement actuator is connected to the main control valve and the second chamber of the gear engagement actuator is closed;
c) a third position in which the first and second working chambers of the gear engagement actuator are connected to the main control valve and isolated from reservoir; and
d) a fourth position in which second working chamber of the gear engagement actuator is connected to the main control valve and the first working chamber is connected to the reservoir.

6. A hydraulic actuation system according to claim 1 in which the gear engagement mechanism includes two gear engagement actuators, a select actuator for moving a select member in a first direction and a shift actuator for moving the select member in a second direction, the select and shift actuators having independent select and shift control valves, the select and shift control valves selectively connecting the select actuator and shift actuator respectively, to the main control valve or to the reservoir.

7. A hydraulic actuation system according to claim 1 in which the main control valve comprises a spool slidably mounted in a bore, the spool having three circumferential lands which sealingly engage the bore, an inlet being provided to the bore for connection to the source of hydraulic fluid under pressure, an outlet from the bore being connected to the reservoir; a first port opening to the bore, the first port being connected to the gear engagement control valve and a second port opening to the bore, the second port being connected to the clutch actuator:
- in a first position of the spool, the first port being isolated from the inlet and outlet and the second port being connected to the outlet;
- in a second position of the spool, the first port being connected to the inlet and the second port being isolated from both the inlet and the outlet; and
- in a third position of the spool, the first and second ports being connected to the inlet.

8. A hydraulic actuation system according to claim 1 in which the gear engagement control valve comprises a spool slideably mounted in bore, the spool having three circumferential lands which sealingly engage the bore, an inlet being provided to the bore for connection to the main control valve; an outlet being provided from the bore for connection to the reservoir; and a first port opening to the bore, the first port being connected to a first working chamber of the gear engagement actuator; the spool having an axial bore opening to one end of the spool, the axial bore connection with a cross-bore opening between first and second lands of the spool:
- in a rest position of the spool, the inlet being connected to the outlet via the cross-bore and axial bore and the first port being connected to the outlet;
- in a null position of the spool, the first port being closed and the inlet being isolated from the outlet;
- in a third position of the spool, the first port being connected to the inlet and isolated from the outlet; and
- in a fourth position of the spool, the first port being connected to the outlet, the inlet being isolated from the first port and the outlet.

9. A hydraulic actuation system according to claim 1 in which the isolation valve isolates the gear engagement actuator from the main control valve, when the pressure in the clutch actuator is above a predetermined value.

10. A hydraulic actuation system according to claim 9 in which the isolation valve isolates the gear engagement actuator from the main control valve, when the pressure in the clutch actuator is above 3 bar.

11. A hydraulic actuation system according to claim 1 in which the isolation valve comprises a spool slidably located in a closed bore, the spool having first and second axially separated land formations which sealingly engage the bore, the second land formation being disposed adjacent one end of the bore, the spool being urged to said one end of the bore by resilient means, a first port opening to the bore between said one end of the bore and the first land formation for connection to the main control valve, a second port opening to the bore between said one end of the bore and first land formation for connection to the clutch actuator, and third and forth ports opening to the bore between the land formations, one of said third and forth ports being adapted to be closed by the second land formation, by movement of the spool away from said one end of the bore, against the load applied by the resilient means.

12. A hydraulic actuation system according to claim 1 in which a plurality of the components are defined by a common housing, the components being interconnected with one another in appropriate manner by passageways formed in the common housing.

13. An automated transmission system including a hydraulic actuation system as claimed in claim 1.

* * * * *